US005151839A

United States Patent [19]

Ota

[11] Patent Number: 5,151,839

[45] Date of Patent: Sep. 29, 1992

[54] CURRENT TRANSMITTING MECHANISM IN MAGNETIC RECORDING AND REPRODUCING APPARATUS

[75] Inventor: Hiroyuki Ota, Yonezawa, Japan

[73] Assignee: Pioneer Electronic Corporation, Tokyo, Japan

[21] Appl. No.: 625,240

[22] Filed: Dec. 10, 1990

[30] Foreign Application Priority Data

Jun. 6, 1990 [JP] Japan ................................ 2-147951

[51] Int. Cl.$^5$ ................................ G11B 5/52

[52] U.S. Cl. ................................ 360/108

[58] Field of Search ................................ 360/108, 64

[56] References Cited

U.S. PATENT DOCUMENTS 3,445,608 5/1969 Kinjo et al. ........................ 360/108

4,926,273 5/1990 Tabuchi et al. ................ 360/108 X

FOREIGN PATENT DOCUMENTS 927308 5/1963 United Kingdom ................ 360/108

*Primary Examiner*—John H. Wolff

*Attorney, Agent, or Firm*—Sughrue, Mion, Zinn, Macpeak & Seas

[57] ABSTRACT

A current transmitting mechanism to be mounted to a magnetic recording and reproducing apparatus having a magnetic head secured to a rotary drum composed of a slip ring, of cylindrical structure, rotatable together with the rotary drum and a brush assembly adapted to contact an outer peripheral surface of the slip ring in an electrically conductive manner for transmitting an electric current signal from the slip ring. The brush assembly consists of a brushing element made of an electrically conductive material contacting the slip ring, a support member for supporting the brushing element at a base portion thereof and an elastic member secured to the brushing element on a side not contacting the slip ring. The brushing element consists of one plate-like brushing member having one surface contacting the outer periphery of the slip ring and the elastic member is secured to another surface of the brush member. The brushing element may also consists of a pair of plate-like members and the elastic member is disposed between the paired brushing members in a sandwiched manner. The brushing element may also consist of a rod-like member made of electrically conductive material and having an outer periphery contacting the slip ring and the elastic member is mounted to surround the base portion of the rod-like member. The current transmitting mechanism may be applicable to a D.C. motor.

9 Claims, 4 Drawing Sheets

CURRENT TRANSMITTING MECHANISM IN MAGNETIC RECORDING AND REPRODUCING APPARATUS

BACKGROUND OF THE INVENTION

This invention relates to a signal transmitting system for a rotary magnetic head utilized for an information recording and reproducing apparatus, and more particularly, to a current transmitting mechanism therefor for transmitting an electric signal between a rotating element and a non-rotating element.

There is known a rotary head device utilized for an information recording and reproducing system such as a video tape recorder (VTR) or a digital audio tape recorder (DAT), in which a rotor of an electric motor and a rotary drum of the motor to which a magnetic head is attached are mounted on a rotating shaft of the motor to integrally rotate the rotor and the rotary drum together with the rotating shaft of the motor. Such a magnetic head device is provided with a magnetic head secured to the rotary drum so as to be rotatable and a current transmitting mechanism for transmitting a signal to a non-rotatable body of the magnetic head device.

In the initial stage of the development of the VTR, such a current transmitting mechanism is provided with a slip ring attached to the rotary drum and a brush element attached to a non-rotatable stationary drum, and an electric signal is transmitted by virtue of the slidable contact between the brush element and the slip ring.

The current transmitting mechanism of the structure described above can be produced with relatively low cost, but is disadvantageous because of the generation of noise due to the sliding contact between the brush element and the slip ring, and because of reduced life time in use due to frictional wear therebetween.

The noises due to the sliding contact generally increase in accordance with the change of the mechanically contacting condition between the brush element and the slip ring. For example, the brush element is subjected to a contacting force at the contacting front portion thereof, thus generating vibration which is one factor of the degrading performance of the mechanical contact. In order to obviate this defect, there has been proposed a current transmitting mechanism capable of maintaining a stable contacting condition by utilizing a plurality of brush elements, each for one signal transmission means, having shifted resonance frequencies, respectively (for example, refer to the Japanese Utility Model Publication No. 48-36665 (36665/73). However, in such a current transmitting mechanism, a plurality of brush elements are required for one channel, which requires additional space for the location thereof. For example, there is known a small size micro-motor provided with a pair of noble metal brush elements between which a slip ring is disposed. The brush elements and the slip ring are contacted during the rotation of a rotor of the micro-motor. The noble brush elements vibrate with characteristic frequencies during the contact to the slip ring so as to thereby contact to or separate from the slip ring. For the reason described above, and as illustrated in FIG. 5 and FIG. 6, the noble metal brush elements 31 in a micro-motor 32 are composed of a plurality of, three for example, parts 31*a*, 31*b* and 31*c* having different lengths and different characteristic frequencies from each other so that at least one of the three parts always contacts the slip ring. In the micro-motor as the current transmitting mechanism of the type described above, since a plurality of brush elements are needed, additional space for the location thereof is required.

In view of the above, about a motor, a brush contacting mechanism has not been employed actually and, a brushless motor has been employed. While, in a signal transmitting mechanism between a rotary magnetic head and a non-rotary element, recently, a non-contact rotary magnetic head device provided with a rotary transformer has been utilized as a current transmitting mechanism.

Since the rotary transformer is an ordinal transformer and thus has a common function such that the transfer loss is reduced as the coupling coefficient between the windings of a rotor and a stator becomes large, it is desired for the the rotary transformer to have a small gap between the rotor and the stator and to have large opposing areas of the cores of the rotor and the stator. In such a non-contact type current transmitting mechanism, the mutual contact between the respective magnetic cores is prohibited, which results in the requirement of improved working and assembling tolerances and performances. Thus, the manufacturing labor and cost may be increased. The increasing of the contact areas of the cores may result in the enlargement of the transformer itself, i.e. a drum assembly to which the transformer is mounted. Accordingly, the non-contact type current transmitting mechanism also has the disadvantages described above.

SUMMARY OF THE INVENTION

An object of this invention is to substantially eliminate defects or drawbacks encountered in the prior art and to provide a current transmitting mechanism for a rotary magnetic head device capable of stably transmitting an electric signal without using a rotary transformer.

Another object of this invention is to provide a current transmitting mechanism capable of stably transmitting an electric signal from a stator side to a rotor side of a D.C. motor.

These and other objects can be achieved according to this invention by providing, in one aspect, a current transmitting mechanism to be mounted to a rotary magnetic head device having a magnetic head secured to a rotary drum comprising a slip ring rotatable together with the rotary drum and a brush assembly adapted to contact to the slip ring in an electrically conductive manner for transmitting an electric current signal from the slip ring. The brush assembly consists of a brushing element made of an electrically conductive material contacting the slip ring, a support member for supporting the brushing element at a base end thereof and an elastic member secured to the brushing element on a side not contacting the slip ring.

In the preferred embodiments, the brushing element has one plate-like brushing member having one surface contacting an outer periphery of the slip ring and the elastic member is secured to another surface of the brush member. The brushing element may has a pair of plate-like members and the elastic member is disposed between the paired brushing members in a sandwiched manner. The brushing element may also be a rod-like member made of electrically conductive material and having an outer periphery contacting the slip ring and the elastic member is mounted so as to surround the base portion of the rod-like member.

In another aspect of this invention, there is provided a current transmitting mechanism to be mounted to a direct current motor secured to a magnetic recording and reproducing apparatus consisting of a slip ring of cylindrical structure rotatable together with a rotor and a brush assembly adapted to contact the slip ring in an electrically conductive manner for transmitting an electric current signal from the slip ring. The brush assembly consists of a brushing element made of an electrically conductive material contacting the slip ring, a support member for supporting the brushing element at a base end thereof and an elastic member secured to the brushing element on a side not contacting the slip ring.

According to the current transmitting mechanism of the structure described above, an electric signal from the slip ring is transmitted to the brush assembly and the brush assembly consists of a brushing element having an elastic and viscous structure capable of substantially absorbing vibration from the slip ring, thus attaining an electrically stably current conductive condition.

DESCRIPTION OF THE PREFERRED EMBODIMENTS

For a better understanding of this invention, the background technology of the art field to which this invention belongs will be first described below with reference to the accompanying drawings.

Figure 7:
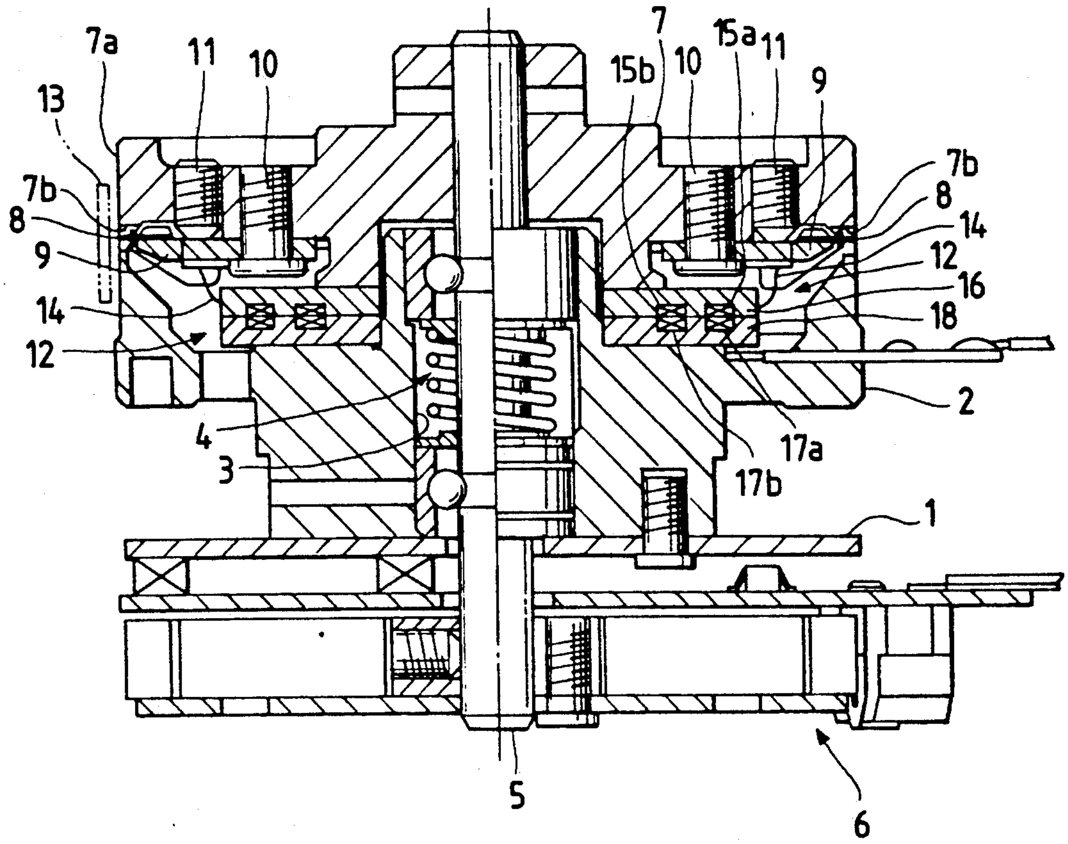
FIG. 7 is a sectional view showing an inside of a conventional magnetic recording and reproducing apparatus to which a rotary transformer and a D.C. brushless motor are employed.

FIG. 7 shows a sectional view of a conventional magnetic recording and reproducing apparatus on which a rotary transformer and a D.C. brushless motor are employed. A reference numeral 1 designates a base plate for a motor. The base plate 1 is secured to a stationary drum 2 and a bearing 4 is mounted in an inner central hole 3 of the stationary drum 2. A rotating shaft 5 is rotatively secured to the stationary drum 2 through the bearing 4. A motor 6 for driving the rotating shaft 5 is mounted to the lower portion of the base plate 1.

A rotary drum 7 is mounted on the upper front end portion of the rotating shaft 5 and a pair of magnetic head support members 9 on which a magnetic head 8 is mounted are secured by means of screws 10. The magnetic head 8 is disposed in a cutout portion **7*b* called a "window" formed in the outer periphery 7*a* of the rotary drum 7 for guiding a magnetic tape 13 so that the magnetic head 8 is rotated together with the rotary drum 7 through the support members 9. The position of the magnetic head 8 is adjusted by an adjusting screw 11 provided for the rotary drum 7**.

Figure 8:
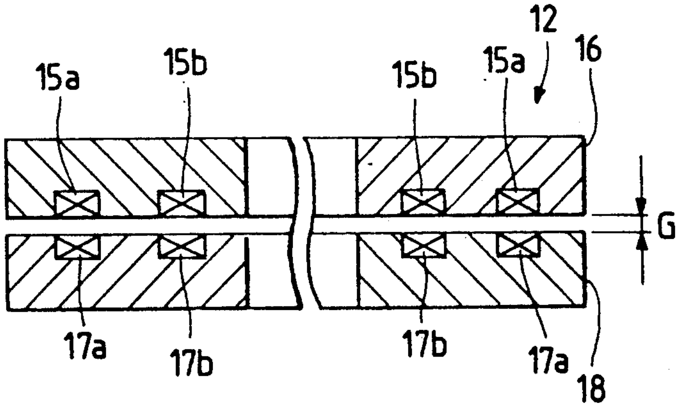
FIG. 8 is a sectional view of a rotary transformer in FIG. 7.

A rotary transformer 12 is disposed between the rotary drum 7 and the stationary drum 2 which is disposed adjacent to the rotary drum 7 and the rotary transformer 12 receives an information signal read out from the magnetic tape 13 by the magnetic head 8 through a lead wire 14 and transfers the information signal to the stationary drum 2, or transfers a signal received from the stationary drum 2 to the magnetic head 8 through the lead wire 14. The rotary transformer 12 consists of a disk-shaped rotor 16 secured to the lower portion of the rotary drum 7 and provided with coaxial coils **15*a* and 15*b* and a disk-shaped stator 18 secured to the stationary drum 2 and having gap G from the rotor 16 and provided with coaxial coils 17*a* and 17*b* opposite the coils 15*a* and 15*b* in a non-contacting condition as shown in FIG. 8. The lead wire 14 of the rotor 16 is soldered to a round portion of the support member 9 of the magnetic head 8 to thereby receive or transfer the electric signal between the magnetic head 8 and the rotor 16. In the rotary magnetic head device of the structure described above, the rotating shaft 5 is rotated by the driving force of the motor 6. The stator 18 of the rotary transformer 12 is secured to the stationary drum 2 so as not to be rotatable, but the rotor 6 is rotated together with the rotary drum 7. Accordingly, a reproduction signal from the magnetic tape 13 is transmitted to the magnetic head 8 and the magnetic head support members 9 rotated together with the rotary drum 7 and the signal is then transmitted to the rotor 16 of the rotary transformer 12 through the lead wire 14 secured to the round portion of the support member 9. In the rotary transformer 12, the reproduction signal is transmitted from the coils 15*a* and 15*b* on the rotor sides respectively to the corresponding coils 17*a* and 17*b* on the stator sides. The recording signal is transmitted from the stator side to the magnetic head 8** through the course reverse to that described above with respect to the reproduction signal.

The prior art technology described above, however, has the disadvantages or defects described hereinbefore and this invention was conceived in view of the above facts.

Figure 1:
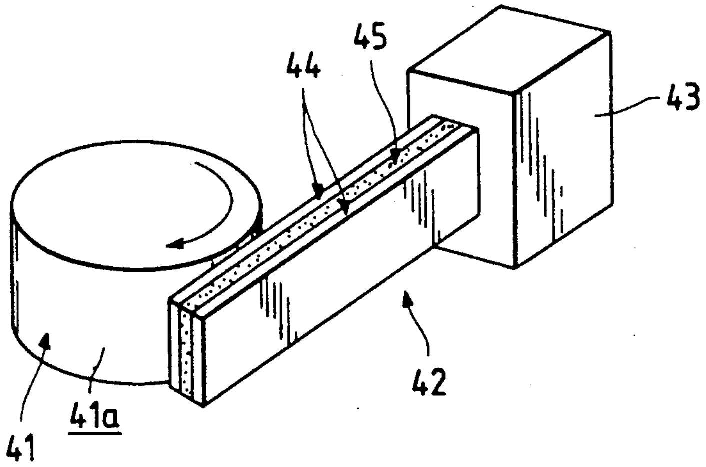
FIG. 1 is a perspective view of a first embodiment of a current transmitting mechanism in magnetic recording and reproducing apparatus according to this invention.

FIG. 1 represents a first embodiment of a current transferring mechanism to be mounted to a rotary magnetic head device according to this invention.

Referring to FIG. 1, a current transmitting mechanism of the illustrated embodiment comprises a slip ring 41 having a cylindrical structure which is rotatable together with a rotary drum to which a magnetic head is attached and a brush assembly 42 which is disposed near the slip ring 41 so as to contact the outer periphery **41*a* of the slip ring 41 in a non-rotatable state. The brush assembly 42 consists of a support member 43 secured to a non-rotatable portion such as a stationary drum of the rotary magnetic head, a pair of brushing elements 44 made of an electrically conductive material and in parallel extending from the support member 43 for transmitting an electric signal in a state contacting the slip ring 41 and an elastic member 45 disposed between the paired brushing elements 44 and 44**. The elastic member is provided with a desired viscosity and flexibility and preferably is made of a rubber or resin material.

Accordingly, the electrically conductive state is established between one of the brushing elements 44 of the brush assembly 42 to the slip ring 41 by making this brushing element 44 contact the outer periphery 41*a* of the slip ring 41 to thereby carry out the signal transmission therebetween. During the signal transmission through contact of the brushing element 44 to the slip ring 41, it is liable for the brushing element 44 to be vibrated as described above. However, the elastic member 45 disposed between two brushing elements 44 and 44 serves as a cushioning member and effectively absorbs the vibration, whereby one of the brushing elements 44 keeps its position contacting the outer periphery 41*a* of the slip ring 41.

The brush assembly 42 as described above may be manufactured by the following manner, for example.

A plate-like member made of an elastic material such as silicone rubber as the elastic member 45, is interposed between two sheets of metal plates each constituting the brushing element 44 with the contacting surfaces thereof being bonded. The thus integrally laminated member is thereafter punched out, for example, so as to have a predetermined shape. The thus punched out member is secured to the support member 43 by a suitable manner, thus preparing the brush assembly 42 such as shown in FIG. 1. In the alteration, an adhesive agent may be coated on the opposing surfaces of the two metal plates constituting the brushing elements 44, which are then bonded to each other, and, the elastic member 45 will be substituted with the adhesive agent layer. However, in many cases, it is desired that the elastic member 45 is provided with a function as a bonding agent.

Figure 2:
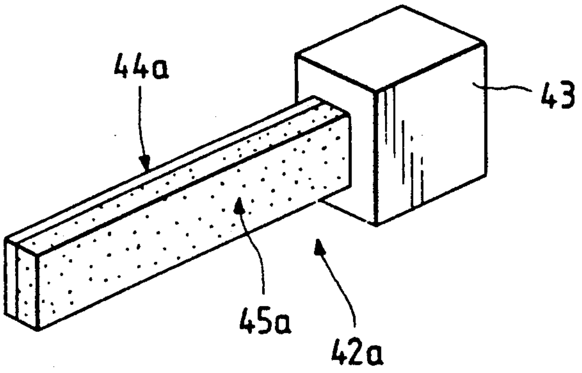
FIGS. 2 and 3 are perspective views of second and third embodiments, respectively, of a current transmitting machanism in magnetic recording and reproducing apparatus according to this invention.

FIG. 2 represents a second embodiment of the brush assembly according to this invention, in which the brush assembly 42*a* consists of a support member 43 of the type described with reference to FIG. 1, one plate-like brushing element 44*a* made of an electrically conductive material and extending from the support member 43 and an elastic member 45*a* bonded to the brushing element 44*a* on the side not contacting the slip ring 41. The brush assembly 42*a* will be easily produced in comparison with the first embodiment shown in FIG. 1 because the brushing element 44*a* is composed of one plate-like member.

Figure 3:
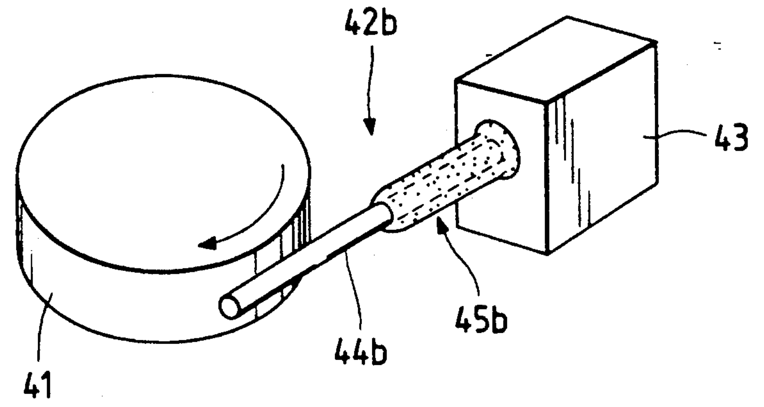

FIG. 3 represents a third embodiment according to this invention, in which a brush assembly 42*b* consists of a support member 43 of the type described above with reference to FIG. 1, a round rod-like member made of an electrically conductive material constituting a brushing element 44*b* extending from the support member 43 and an elastic member 45*b* which is disposed so as to cover the entire outer periphery of a base portion, near the support member 43, of the rod-like brushing member 44*b*. The elastic member 45*a* is, in this embodiment, prepared by coating an elastic substance on the base portion of the brushing member 44*a* to thereby absorb the vibration of the brushing member 44*a* generated during the contact with a slip ring 41 which has substantially the same structure as that shown in FIG. 1. In the alternative, a tubular member may be mounted to the rod-like brushing member 44*a* so as to surround the outer periphery of the base portion thereof and the tubular member may be thereafter bonded thereto.

Figure 4:
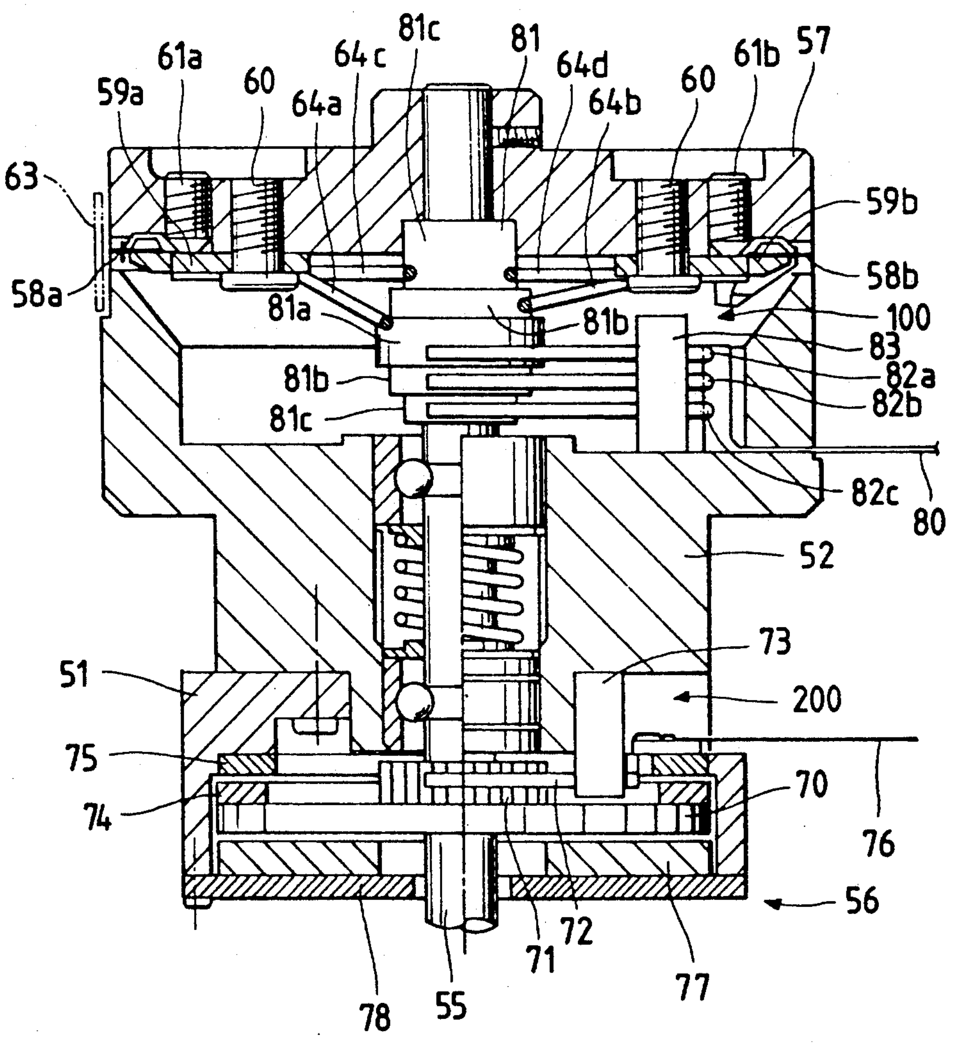
FIG. 4 is a sectional view showing an inside of a magnetic recording and reproducing apparatus to which a current transmitting mechanism of this invention is applied.
Figure 5:
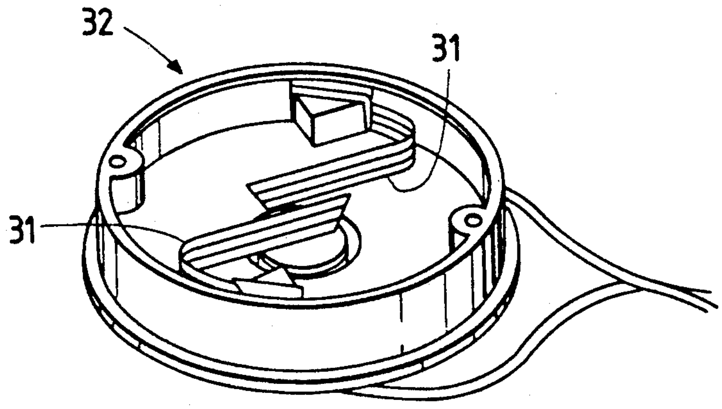
FIG. 5 PRIOR ART
FIG. 5 is an illustration showing improved conventional brushing elements which are utilized for the micro-motor.
Figure 6:
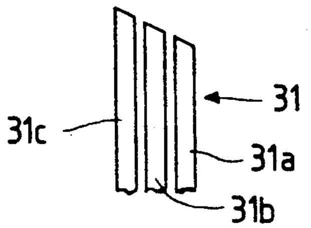
FIG. 6 PRIOR ART
FIG. 6 is a partial view of a plurality of parts of brush element in FIG. 5.

The current transmitting mechanisms of the first to third embodiments according to this invention will be utilized for transmitting an electric signal for a rotary magnetic head and a D.C. motor, as illustrated in FIG. 4.

As shown in FIG. 4, a magnetic recording and reproducing apparatus includes a first current transmitting mechanism 100 for an electric signal for rotary magnetic heads 58*a* and 58*b* and a second current transmitting mechanism 200 for a direct current motor 56.

The motor 56 is secured to a holder 51 fixed to a stationary drum 52. A rotating shaft 55 is rotatably supported by the stationary drum 52. The motor 56 comprises a rotor (an armature) 70 fixed to the rotating shaft 55, a slip ring (being called a "commutator") 71 of cylindrical structure fixed to the rotor 70 and rotatable together with the rotor 70, and a pair of brushing elements 72 secured to a brush holder 73 fixed to the stationary drum 52. The motor 56 further comprises a F.G. (frequency generator) magnet 74 secured to the rotor 70, a F.G. printed circuit board 75 fixed on the holder 51 and connected to both of the brushing elements 72 and a flexible printed circuit board 76, and a ferrite magnet 77 fixed to a yoke 78 secured to the holder 51. The brushing elements 72 are brought into contact with the slip ring 71 to establish an electrically conductive state to thereby pass an electric current.

A rotary drum 57 is mounted on an upper front end portion of the rotating shaft 55. A pair of magnetic head support members 59*a* and 59*b* on which the magnetic heads 58*a* (for a first channel) and 58*b* (for a second channel) are respectively mounted are secured to the rotary drum 57 by a few of binding screws 60. The magnetic heads 58*a* and 58*b* are disposed in a cutout portion for guiding a magnetic tape 63 so that the magnetic heads 58*a* and 58*b* are rotated together with the rotary drum 57 through the support members 59*a* and 59*b*. The positions of the magnetic heads 58*a* and 58*b* are adjusted by a plurality of adjusting screws 61*a* and 61*b* provided for the rotary drum 57.

The first current transmitting mechanism 100 is disposed between the rotary drum 57 and the stationary drum 52 which is disposed adjacent to the rotary drum 57. The first current transmitting mechanism 100 receives an information signal read out from the magnetic tape 63 by the magnetic head 58*a* through a lead wire 64*a* for the first channel and by the magnetic head 58*b* through a lead wire 64*b* for a second channel and transfers the information signal to a flexible printed circuit board 80 secured to the stationary drum 52, or transfers a signal received from the circuit board 80 to the magnetic heads 58*a* and 58*b* through the lead wires 64*a* and 64*b*, respectively. Reference numerals 64*c* and 64*d* are two lead wires of common for ground. The first current transmitting mechanism 100 comprises a slip ring 81 having three, that is, a first, second and a third portions 81*a* to 81*c* and secured to the rotating shaft 55 and rotatable together with the rotary drum 57, a brushing element 82*a* for the first channel, a brushing element 82*b* for the second channel, a brushing element 82*c* of common for ground, and a brushing element holder 83 secured to the stationary drum 52 and supporting three brushing elements 82*a*, 82*b* and 82*c* connected to the circuit board 80, respectively. The brushing element 82*a* is brought into contact with the first portion 81*a* connected to the lead wire 64*a*, and the brushing element 82*b* is brought into contact with the second portion 81*b* connected to the lead wire 64*b*, and the brushing element 82*c* is brought into contact with the third portion 81*c* connected to the lead wire 64*c* for the support member 59*a* and the lead wire 64*d* for the support member 59*b*. The three portions 81*a* to 81*c* of the slip ring 81 are insulated from one another. Therefore, the electric signal for the first channel transfers between the magnetic head 58*a* and the printed circuit board 80 through the support member 59*a*, the lead wire 64*a*, the portion 81*a* of the slip ring 81 and the brushing element 82*a*. And the electric signal for the second channel transfers between the magnetic head 58*b* and the printed circuit board 80 through the support member 59*b*, the lead wire 64*b*, the portion 81*b* of the slip ring 81, and the brushing element 82*b*. Further, a current for ground transfers between the magnetic heads 58*a*, 58*b* and the printed circuit board 80 through the support members 59*a* and 59*b*, the lead wires 64*c* and 64*d*, the portion 81*c* of the slip ring 81, and the brushing element 82*c*.

In this case, the brushing elements 72 and 82*a* to 82*c* are respectively provided with an elastic member as described with reference to the foregoing embodiments.

As described above, according to this invention, the resonance frequency of the brushing element is lowered and the stability in the contacting state to the slip ring can be realized. Moreover, only one brush assembly is utilized for one channel, resulting in the saving of space. Accordingly, this invention is more effectively utilized for an information recording and reproducing system such as DAT radio cassette which is required to be manufactured with a reduced size and cost.

What is claimed is:

1. A current transmitting mechanism to be mounted on a magnetic recording and reproducing apparatus having a magnetic head secured to a rotary drum, comprising:

a slip ring rotatable together with the rotary drum; and a brush placed in contact with said slip ring in an electrically conductive manner so as to transmit an electric current signal from said slip ring, said brush comprising a brushing element made of an electrically conductive material contacting said slip ring, a support member for supporting said brushing element at a base end thereof and an elastic member secured to said brushing element on a side not contacting said slip ring, said elastic member having an elasticity different from that of said brushing element.

2. A current transmitting mechanism according to claim 1, wherein said brushing element comprises one plate-like brushing member having one surface contacting an outer periphery of said slip ring and said elastic member is secured to another surface of said brushing member.

3. A current transmitting mechanism according to claim 1, wherein said brushing element comprises a pair of plate-like members and said elastic member is disposed between said paired brushing members in a sandwiched manner.

4. A current transmitting mechanism according to claim 1, wherein said elastic member is made of rubber.

5. A current transmitting mechanism according to claim 1, wherein said elastic member is made of resin material.

6. A current transmitting mechanism according to claim 1, wherein said elastic member is a coating agent to be coated on a surface, not contacting said slip ring, of said brushing element.

7. A current transmitting mechanism according to claim 1, wherein said brushing element comprises a rod-like member made of electrically conductive material and having an outer periphery contacting said slip ring and said elastic member is mounted to surround a base portion of said rod-like member.

8. A current transmitting mechanism according to claim 7, wherein said elastic member is a coating agent coated on an entire outer peripheral surface of the base portion of said rod-like brushing member.

9. A current transmitting mechanism to be mounted on a direct current motor secured to a magnetic recording and reproducing apparatus, comprising:

a slip ring of cylindrical structure rotatable together with a rotor; and a brush placed in contact with said slip ring in an electrically conductive manner so as to transmit an electric current signal from said slip ring, said brush comprising a brushing element made of an electrically conductive material contacting said slip ring, a support member for supporting said brushing element at a base end thereof and an elastic member secured to said brushing element on a side not contacting said slip ring, said elastic member having an elasticity different from that of said brushing element.

* * * * *